(No Model.)
J. G. BROWN.
Water Trough and Underground Drain.
No. 243,501. Patented June 28, 1881.
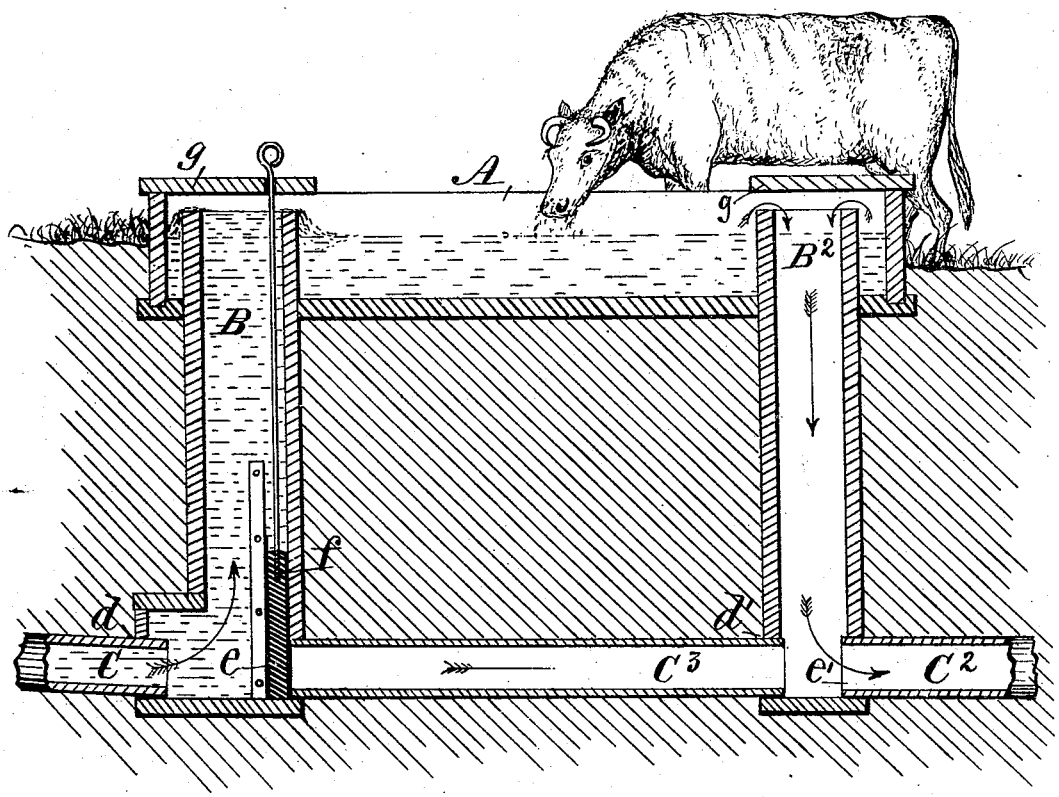
Witnesses:
R. G. Orwig.
A. F. Newell
Inventor:
John G. Brown,
By Thomas G. Orwig, Attorney.

UNITED STATES PATENT OFFICE.

JOHN G. BROWN, OF VAN CLEVE, IOWA.

WATER-TROUGH AND UNDERGROUND DRAIN.

SPECIFICATION forming part of Letters Patent No. 243,501, dated June 28, 1881.

Application filed May 5, 1881. (No model.)

*To all whom it may concern:*

Be it known that I, JOHN G. BROWN, of Van Cleve, in the county of Marshall and State of Iowa, have invented a Watering-Trough and Underground Drain Combined, of which the following is a specification.

The object of my invention is to provide a simple, cheap, and durable means for controlling, elevating, and utilizing water in underground drains for the purpose of watering horses, cattle, and all kinds of live stock.

It consists in combining a trough, a reservoir having a gate or valve, and an underground drain, as hereinafter fully set forth.

My accompanying drawing is a longitudinal and vertical section of my invention in position as required in practical use, and illustrates its construction and operation.

A represents a trough of common form partly embedded in the ground. It is preferably made of hard wood and may vary in size, as desired. In place of setting it partly underground it may rest on the surface of the ground, or in an elevated position on suitable supports.

B represents a tube or reservoir, also preferably made of hard wood, set in the ground and combined at its top with one end of the trough, and at its bottom with an underground drain, C, in such a manner as to form a section of the continuous drain. It has an opening or induction-port, $d$, to admit the end of a tube or piece of drain-tile in such a manner that water flowing from the elevated end of the drain and source of water-supply will enter the reservoir B and ascend therein and overflow therefrom into the trough A, when required.

$e$ is an opening or eduction-port immediately opposite the induction-port $d$ in the pipe or reservoir B.

$f$ is a gate or valve that slides vertically in suitable bearings formed on or attached to the reservoir in such a manner that the port $e$ can be readily opened and closed therewith by means of a suitable handle that extends up therefrom.

$B^2$ represents a boxing or tube corresponding in length with the reservoir B, fixed to the opposite end of the trough in such a manner that when the water rises to a certain height in the trough it will flow into the tube. The lower end of this tube is combined with the drain portion $C^2$ by means of openings $d'$ and $e'$ in such a manner that the water that enters at its top will be conducted away underground by the descending portion and outlet of the continuous drain.

$C^3$ is a section of drain that enters the eduction-port $e$ in the reservoir B, and the induction-port $d'$ in the tube $B^2$, as required, to form a continuous underground drain beneath the trough A.

$g\ g$ represent covers fixed to the ends of the trough to protect the open top of the tubes B and $B^2$, that extend upward in the trough.

In locating the trough relative to a drain it must be placed on a level with or below the level of the source of the water-supply and the end of the drain connected with that source.

In the practical operation of my invention thus constructed I simply close the gate or valve $f$, and thereby check the water from flowing direct through the continuous drain, and cause it to ascend in the reservoir and overflow therefrom into the trough; and when the water rises in the trough to the top of the eduction-tube $B^2$ there will be an abundant supply of water that is accessible to animals, and from whence live stock in the field or yard where it is located can drink at pleasure. Water that is not consumed will flow into the eduction-tube and descend again into the underground drain, to be carried off thereby. To prevent the water from rising up into the trough I simply open the gate or valve $f$ to allow it to flow on in the continuous drain. By opening the valve occasionally any dirt or sediment that may gather in the reservoir and drain will be washed out and carried off in the continuous and descending drain.

I claim as my invention—

1. The combination of a trough, A, a tube or reservoir, B, an underground drain, C, connected with a water-supply, an eduction-tube, $B^2$, and an outlet-drain, $C^2$, substantially as shown and described, to operate in the manner set forth, for the purposes specified.

2. An automatic stock-watering device composed of a trough, A, a tube or reservoir, B, having ports $d$ and $e$, and a valve, $f$, a tube, $B^2$, having ports $d'$ and $e'$, and underground-drain sections C, $C^2$, and $C^3$, substantially as shown and described.

JOHN G. BROWN.

Witnesses:
 THOMAS C. OWINGS,
 D. P. NEGLY.